E. G. DODGE.
GALVANIC BATTERY.
APPLICATION FILED FEB. 19, 1912.

1,048,505.

Patented Dec. 31, 1912.

2 SHEETS—SHEET 1.

WITNESSES
F. B. Townsend.
Irene Lefkowitz

INVENTOR
Eben G. Dodge
BY
Townsend & Decker
ATTORNEYS

E. G. DODGE.
GALVANIC BATTERY.
APPLICATION FILED FEB. 19, 1912.
1,048,505.
Patented Dec. 31, 1912.
2 SHEETS—SHEET 2.
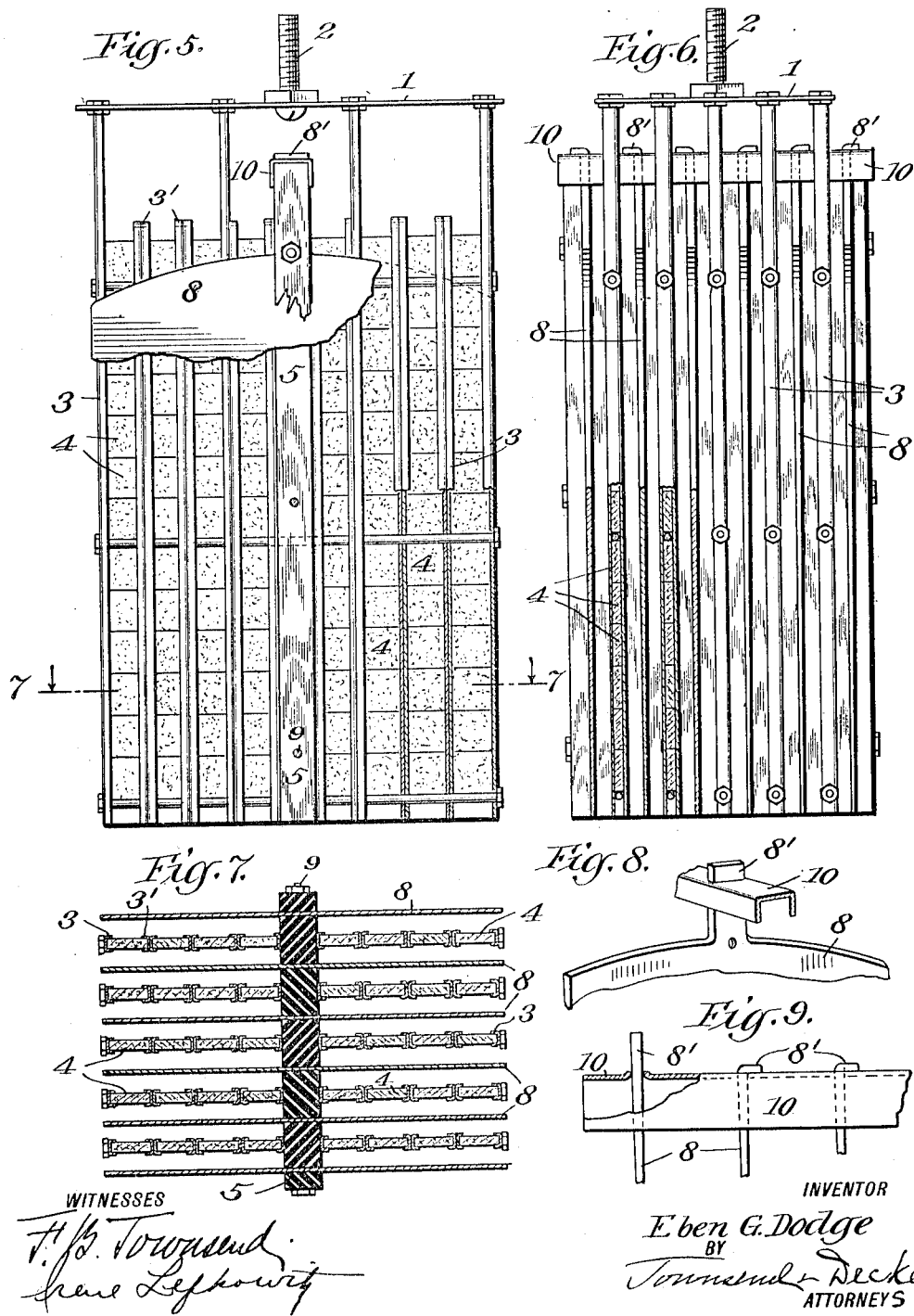
WITNESSES
INVENTOR
Eben G. Dodge
BY
Townsend & Decker
ATTORNEYS

UNITED STATES PATENT OFFICE.

EBEN G. DODGE, OF SOUTH ORANGE, NEW JERSEY.

GALVANIC BATTERY.

1,048,505.  Specification of Letters Patent.  Patented Dec. 31, 1912.

Application filed February 19, 1912. Serial No. 678,609.

*To all whom it may concern:*

Be it known that I, EBEN G. DODGE, a citizen of the United States, and a resident of South Orange, in the county of Essex and State of New Jersey, have invented certain new and useful Improvements in Galvanic Batteries, of which the following is a specification.

My invention relates to the construction of voltaic batteries.

Briefly stated, the object of the invention is to provide a simple, compact and cheap construction for a battery in which the positive and negative elements consist of a series of plates assembled in parallel relation and by preference connected up in parallel circuit to afford a battery having large surface exposed to the exciting fluid, so as to give large quantity effects. The invention however is not limited to connecting up the various elements in parallel relation.

The invention is particularly useful for that class of batteries in which one of the elements is composed of a mass of copper or other oxid or depolarizing agent held in a metallic support.

The invention will be described and carried out in a battery having for one element copper oxid and a copper sustaining frame, and for its other element a plate of zinc.

The particular features of construction constituting my invention will be first described in connection with the accompanying drawings and then specified in the claims.

Figure 1:
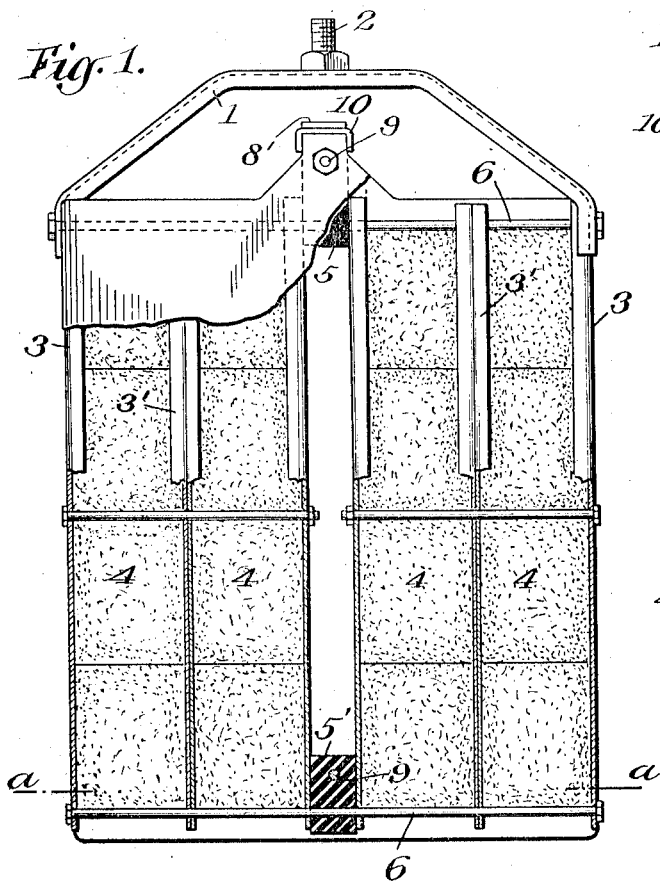
Figure 2:
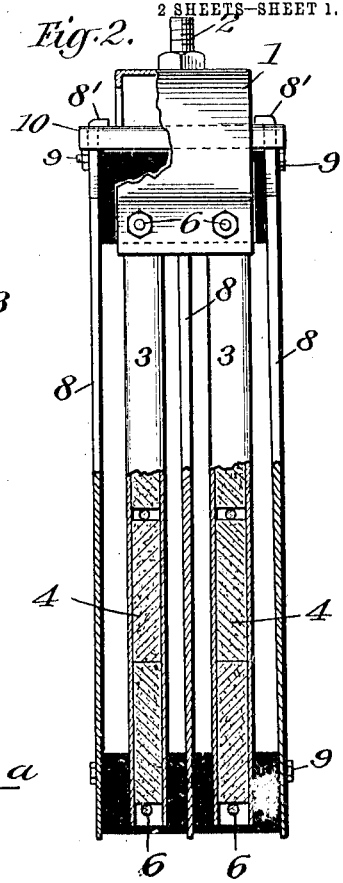
Figure 3:
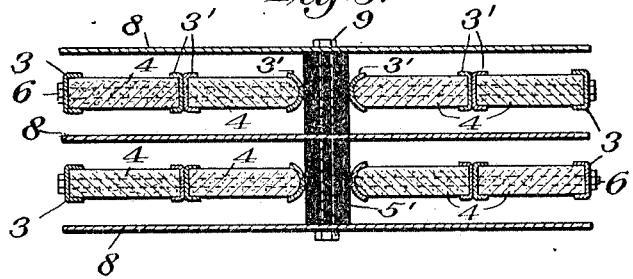
Figure 4:
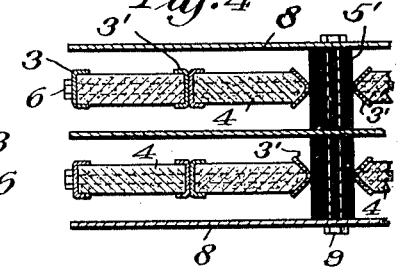

Figure 1 is a side elevation of a battery constructed in accordance with my invention, one of the plates constituting the zinc element being shown broken away, as well as parts of the sustaining frame for the copper oxid. Fig. 2 is an edge view of the same, parts being shown in section. Fig. 3 is a horizontal cross-section on the line *a—a* Fig. 1. Fig. 4 is a horizontal cross-section showing a modification in the form of the grooved or channeled bars constituting a part of the sustaining frame. Fig. 5 is a front elevation of a modification of the battery, Fig. 6 an edge view, parts being shown in both cases broken away. Fig. 7 is a horizontal cross-section on the line 7—7 of Fig. 5. Fig. 8 shows a perspective in the manner of connecting the zinc plates with a common electrical connecting bar. Fig. 9 is a side view of said bar showing some of the ears of the zinc plates turned down on the top of said bar preparatory to welding or soldering.

1 indicates a metallic yoke preferably of copper having a screw or bolt extending upwardly at the center to afford means for hanging said yoke from a suitable support over the battery containing cell containing the solution. The depending ends of said yoke carry the vertical channel bars 3 of copper or other suitable metal which constitute the vertical edges of a metal frame or frames carrying the copper or other oxid tablets 4.

In the present instance I show two frames in which are assembled copper oxid tablets or plates 4 to form two negative plates for the battery. Intermediate the bars 3 forming the edges of the sustaining frame are other sets of bars 3′, all being assembled to form a frame sub-divided vertically, so that in each negative plate there shall be four vertical rows of oxid tablets. Obviously, the subdivision might be carried to any desired extent. In the Figs. 5 and 7 the sub-division is such as to afford eight vertical rows of tablets.

At or about the center of each sub-divided frame the spacing block 5 of insulating material is provided at the top of the frame and a similar one at the bottom indicated at 5′. Obviously, any number of spacing blocks might be used. Through these spacing blocks extend the horizontal bolts 6 which tie the channel bars constituting the frame together and to the yoke 1 at the top and bottom of the frame, as clearly shown in the drawing.

The grooved or channeled bars are preferably so formed as to have a rocking bearing at the points where they bear and are forced against the spacing blocks, and also if desired, where they bear against one another back to back on the lines of the vertical subdivision, the purpose of this being to accommodate any irregularities of the tablets and to prevent breakage when the tie-bolts 6 are drawn up.

Intermediate horizontal bolts may be employed, as shown, at or about the center, to further stiffen the frame, the effect being also to form a further sub-division of the frame, which is however not important. As will be seen, the tablets constituting the upper portion of each negative element are sustained upon these intermediate horizontal bolts or rods, while the lower horizontal bolt 6 sustains the lower set of tablets. This construction of frame permits, as will be seen further, sub-division of each negative element into a large number of copper oxid plates which in effect are mere tablets and which, being of small dimensions, are much less liable to breakage than the larger size of copper oxid plates heretofore employed.

The zinc or positive element of the battery consists of zinc plates 8 alternating with the copper oxid plates and sustained from the same frame as the copper oxid element by attachment to the spacing blocks 5 of insulating material. This attachment may be effected by means of bolts 9 passing transversely through said spacing bars or at right angles to the rods or bolts 6. Intermediate zinc plate 8 is held between the two sub-divisions of spacing block 5, as clearly indicated in Fig. 3. The zinc plates are preferably provided with the upwardly extending ears 8' through which the fastening bolts or rods 9 may be passed. In order that the zinc plates may be joined together as one element electrically, the upper ends of said ears of whatever form, are passed through slots in a connecting bar 10, as shown more clearly in Figs. 8 and 9, and the ends of said ears are turned down upon said connecting bar and are then welded by the oxy-acetylene flame, or otherwise connected to said bar to form good electrical connection therewith, said bar thus becoming the common terminal of the multiple zinc plates. The spacing of the zinc plates from the oxid plates at the bottom is insured by the sub-divided spacing blocks 5' at the bottom of the frame, as clearly shown.

In the modification of my invention shown in Fig. 5, the yoke 1, instead of having its ends bent down to connection with the channel bars forming the edge of the frame, is made straight, and the end bars as well as some of the intermediate bars of said frame are attached to said yoke in the manner indicated in Fig. 5. In this form of my invention the sub-division of the copper oxid plates to form a vertical sub-division devoid of active material, which is the effect of the construction shown in Fig. 1, is produced by the use of vertical spacing rods or bars 5 extending vertically from top to bottom of the frame, in which case the transverse bolts like 9 and passing through the zinc plates may be repeated as often as desired to secure the desired rigidity and fixity of position of the zinc elements with relation to the copper oxid plates or elements facing them.

In both constructions, to wit those shown in Figs. 1 and 5, it will be seen that there is a sub-division of the metallic framework vertically making it possible to sub-divide the copper oxid into small tablets which are slipped into the vertical sub-divisions and held in position in the channeled members of the sub-divided frame. It will further be seen that the sub-division at or about the center of said frame to afford a space in the negative element devoid of active material, will prevent disintegrating action of the zinc element in the portion thereof opposite said space, so that there will be no weakening of that portion of the zinc element, and said portion will form a sustaining rib which will be unimpaired by the battery action and will afford by a part projecting upward therefrom out of the battery liquid a support for the disintegrating portions of the plate, so that the latter will be more completely consumed before falling apart.

What I claim as my invention is:

1. A voltaic battery having a negative element consisting of a framework comprising a series of channel bars of conducting material arranged and spaced apart vertically with their channels opposed to one another to afford a series of vertical tablet holding spaces and copper oxid subdivided both vertically and horizontally into a multiplicity of tablets and sustained in the spaces between said bars.

2. In a voltaic battery, a negative element comprising tablets of depolarizing oxid and a sustaining metallic frame for said tablets consisting of a metallic yoke piece and vertical channel bars of conducting material depending from said yoke piece to form the edges of the frame, and intermediate vertical channel bars subdividing the frame vertically and having their channels opposed to one another to form vertical tablet holding divisions, the oxid being subdivided both vertically and horizontally into a multiplicity of tablets which are sustained between the vertical channel bars.

3. In a voltaic battery, a negative electrode consisting of a metallic depolarizing oxid and a sustaining frame therefor composed of vertical channel bars, a spacing block and bolt holding and spacing said bars apart vertically into tablet holding spaces, combined with a positive element consisting of a number of plates sustained from said block by a transverse rod or bolt.

4. In a voltaic battery, the combination of a sustaining frame for the negative element comprising a yoke and vertical spacing bars sustained from said yoke, an insulating spacing block adapted to sub-divide the negative element and provide a vertical space devoid of active material, and a positive element or elements also sustained from said spacing block.

5. In a voltaic battery, a sustaining frame for depolarizing oxid having a vertical grooved or channel bar spaced apart from another member to form a space for holding the oxid in tablet form and having a vertical rocking bearing at its rear as and for the purpose described.

6. In a voltaic battery, a negative element composed of depolarizing material subdivided into tablets and sustained in a metallic frame, insulating blocks interposed in said frame to form a vertical space between the sections thereof and a bolt passing through said block transversely and sustaining the positive element.

7. In a voltaic battery the combination of a positive or disintegrating element, a negative element sub-divided vertically to provide a space devoid of active material opposite the positive or disintegrating element so as to preserve therein an inactive sustaining rib or portion during action of the battery and means for sustaining said element by a portion thereof projecting upward from said inactive portion.

8. In a voltaic battery, multiple negative and positive elements alternating with one another and combined with spacing and sustaining blocks of insulating material spacing the positive and negative elements from one another and at the same time spacing portions of each negative element in its own plane.

9. In a voltaic battery, the combination of a sustaining frame composed of a metallic yoke and vertical channel bars, tie rods or bolts at the bottom and the top securing said channel bars in position, insulating blocks interposed in the plane of the frame and a multiple positive element sustained by said blocks in properly spaced relation to the negative element.

10. A sustaining frame for the copper oxid tablets of a copper oxid battery, comprising a yoke of metal having depending ends, a channeled oxid supporting frame the end channels of which are sustained in the ends of said yoke and horizontal tie rods or bolts passing through said end channels and yoke ends as and for the purpose described.

11. A sustaining frame for the copper oxid tablets of a copper oxid battery, comprising a yoke of metal having depending ends, a channeled oxid supporting frame the end channels of which are sustained in the ends of said yoke and horizontal tie rods or bolts passing through said end channels and yoke ends, intermediate channel bars between said end bars and blocks of insulation interposed to sub-divide the frame vertically.

12. A sustaining frame for the copper oxid element of a voltaic battery, consisting of a series of vertical channel bars spaced apart to form a series of vertical oxid holding spaces, a sustaining yoke from which channel bars of the series depend and copper oxid subdivided both vertically and horizontally into a multiplicity of tablets and sustained in the spaces between the vertical channel bars.

Signed at New York in the county of New York and State of New York this 17th day of February A. D. 1912.

EBEN G. DODGE.

Witnesses:
F. B. TOWNSEND,
M. A. PORTER.

---

Copies of this patent may be obtained for five cents each, by addressing the "Commissioner of Patents, Washington, D. C."